United States Patent Office 3,433,850
Patented Mar. 18, 1969

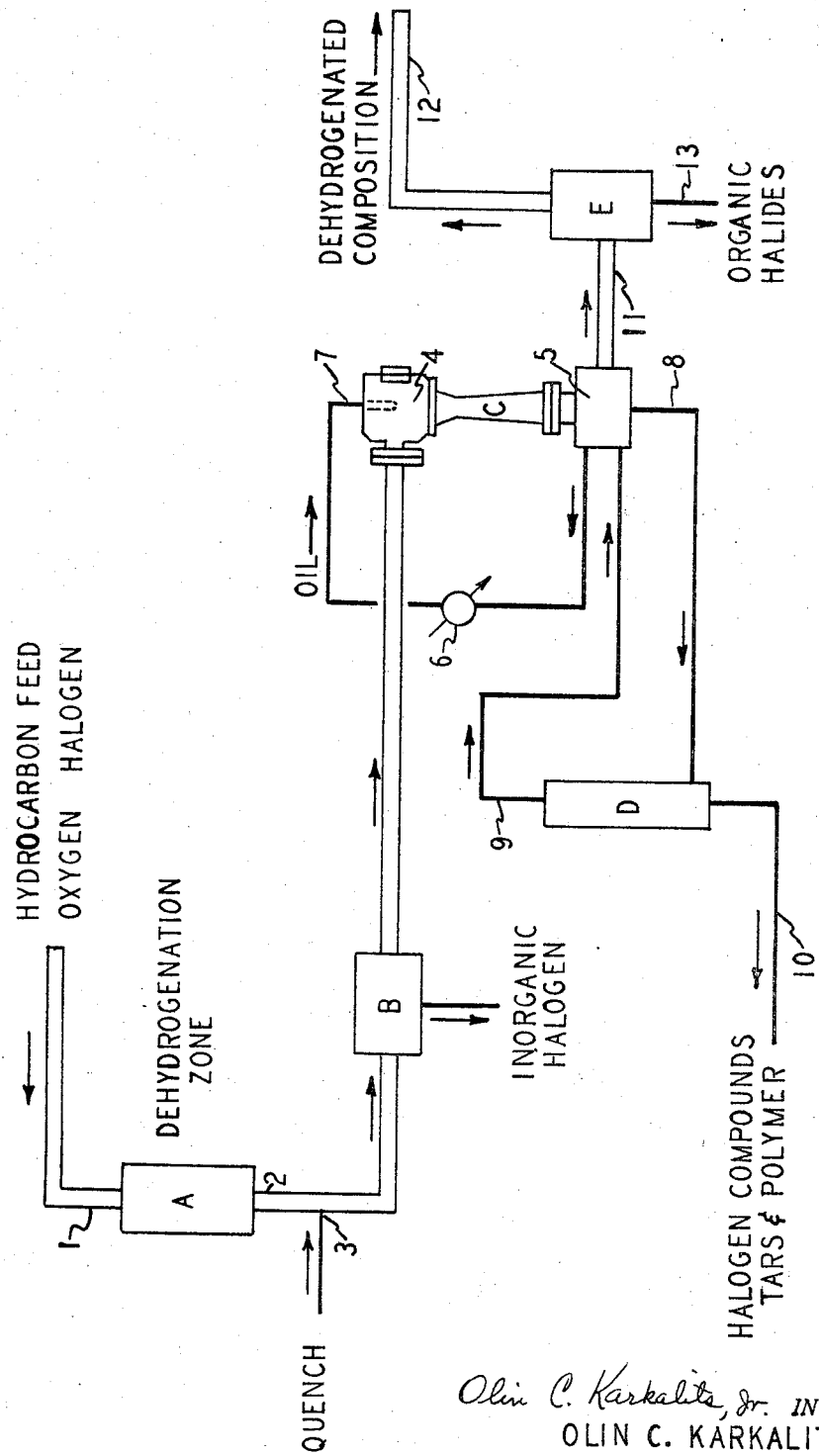

3,433,850
PREPARATION OF UNSATURATED HYDROCARBONS
Olin C. Karkalits, Jr., Houston, Tex., assignor to Petro-Tex Chemical Corporation, Houston, Tex., a corporation of Delaware
Filed June 26, 1963, Ser. No. 290,686
U.S. Cl. 260—680      6 Claims
Int. Cl. C07c *11/00, 7/02*

ABSTRACT OF THE DISCLOSURE

Process for the oxidative dehydrogenation of aliphatic hydrocarbons wherein tars, polymers and precusors thereof are removed from the dehydrogenation effluent by dissolving these undesirable materials in a concurrent oil spray in a diffuser chamber. Production and recovery of methyl halides are also disclosed.

---

Figures 1, 2:
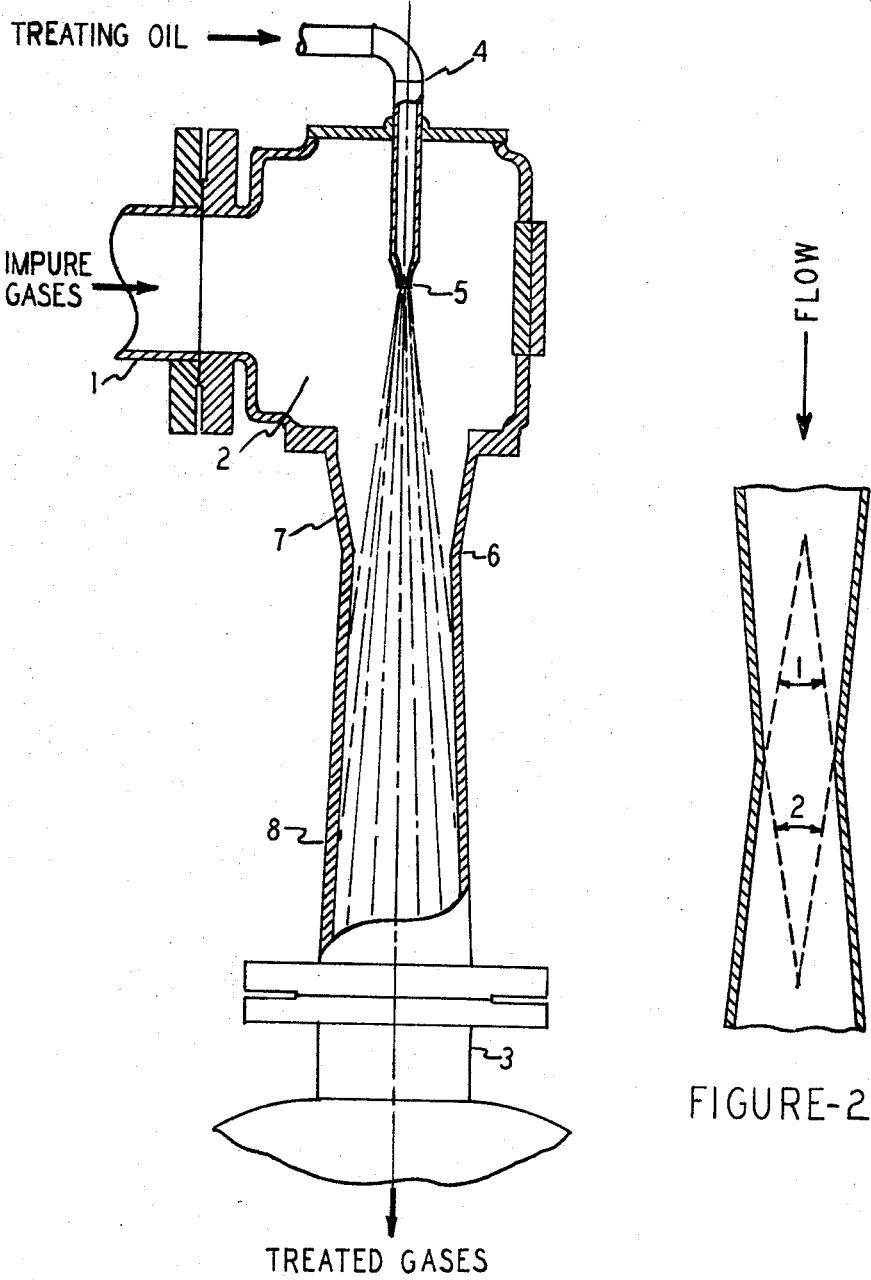

This application relates to a process for the preparation of olefins and diolefins and more particularly relates to an improved method for the separation and purification of olefins produced by the dehydrogenation of aliphatic hydrocarbons utilizing oxygen in the dehydrogenation reaction.

Olefins and diolefins such as butene and butadiene are commercially produced by the catalytic dehydrogenation of more saturated aliphatic hydrocarbons. Butadiene is produced in large quantities by the dehydrogenation of butane and butene in fixed bed reactors. Higher conversions, yields and selectivities of product are desired than are presently obtained.

An improved process for the preparation of unsaturated hydrocarbons such as butadiene-1,3 is the process whereby aliphatic hydrocarbons such as butane and butane and butene are dehydrogenated at elevated temperatures in the presence of catalysts and oxygen. Improved results and yield of product are thereby obtained. However, one difficulty with such a process is that the oxygen causes the formation of various polymers, tars, and precursors thereof. It is one of the objectives of this invention to provide a process for the removal of these polymers, tars and precursors from the unsaturated organic product.

The dehydrogenation processes utilizing oxygen may be further improved by the addition of halogens to the dehydrogenation zone as disclosed in copending applications e.g., U.S. application No. 36,705, filed June 17, 1960, now U.S. Pat. No. 3,207,805. When hydrocarbons are dehydrogenated in such a manner utilizing oxygen and halogen, the halogens also contribute to the formation of polymers, tars and precursors thereof. It is a primary object of this invention to provide a method for the removal of these polymers, tars and precursors thereof from such a process. Another object is to provide a process for the simultaneous production of dehydrogenated hydrocarbons and organic halides, such as methyl halides.

According to the processes of this invention, aliphatic hydrocarbons are dehydrogenated at an elevated temperature in a dehydrogenation zone in the presence of oxygen, and preferably halogen. The dehydrogenation zone effluent is then preferably cooled and thereafter fed into one end of an elongated diffuser chamber to maintain a vapor zone, intimately contacting with oil the gaseous mixture in the vapor zone by spraying with an oil selected from the group consisting of paraffins, naphthenes, and aromatic oils and mixtures thereof, having a boiling point of at least 50° C., a Saybolt viscosity at 100° F. of at least 10 seconds, and a bromine number of no greater than 50, said oil being sprayed into the vapor zone at a velocity which provides turbulent mixing of the oil and gaseous mixture in the vapor zone, whereby the tars, polymers and precursors thereof of the dehydrogenation zone effluent are dissolved in the oil and thereafter separated from the oil and the remaining gaseous phase passes through the elongated chamber.

A specific embodiment of the elongated diffuser chamber apparatus in which the impure gaseous mixture is contacted with oil is illustrated in FIGURE 1. The impure gaseous mixture enters the apparatus through inlet line 1 and is conducted to a vapor zone 2. The gaseous mixture is contacted by the specified oil in zone 2 and the treated gases exit through section 3. The apparatus comprises an inlet line 4 for the specified oil and a nozzle 5 for spraying the oil into the elongated chamber which is tapered to a minimum diameter 6 near the middle, and then flares out to a maximum diameter at the exit 3. The elongated chamber comprises a contraction section 7 and an expansion section 8. The apparatus has the diffuser shape as shown with the oil being sprayed into the vapor zone prior to the point of minimum diameter 6. Preferably the oil will not strike the walls of the chamber within the contraction section. Turbulent mixing of the oil and gaseous stream is thereby obtained. As shown the oil is sprayed into the vapor concurrent to the flow of the gases to be treated. Suitable dimensions for the diffuser chamber and the nozzle 5 are selected to provide a high velocity flow, and to provide a turbulent mixing of the oil with the gases being treated. The pressure necessary for spraying the oil may be supplied such as by a centrifugal pump.

An illustration of a preferred process of this invention is illustrated in FIGURE 3. A mixture of the hydrocarbon feed, oxygen and halogen enters the dehydrogenation zone A at 1. In dehydrogenation zone A the hydrocarbon feed is dehydrogenated by heating the mixture to an elevated temperature. The hot dehydrogenation zone effluent exits by line 2 and is quenched at 3. The quenched gases are then conducted to B which is a separator for a mapor portion of the inorganic halogen and thereafter the gases are treated in the oil contracting device C. The specified oil contacts the impure gases at 4 and the mixture of gases and oil is separated in tank 5. Oils from tank 5 may be passed through a heat exchanger 6 to adjust the temperature thereof to a temperature at least as high as the dew point of the water in the incoming gases and recycled to the spray nozzle via line 7. The oil in tank 5 contains polymeric impurities, and a portion of this impure oil is removed at 8 and conducted to a rerun distillation tower D and recycled to tank 5 via line 9. The polymer and organic halides having 2 or more carbon atoms are separated as a bottoms 10. The treated gases comprising unsaturated hydrocarbon, methyl halides and perhaps some residual oxygen are conducted to a separator E wherein the dehydrogenated product leaves through line 12 and the organic halide product, which are methyl halides, are separated at 13.

The process according to the present invention offers several important advantages. One of the primary problems in such a dehydrogenation process is the separation of tars and polymers from the gaseous product in an efficient manner. One difficulty is that tars and polymers tend to plug the internal parts of the separating devices. For example, when a packed tower was employed to separate the tars of the dehydrogenation zone effluent, it readily plugged with tars and polymers and was impractical to use. The oil contacting process of this invention efficiently removes tars and polymers for prolonged periods without plugging. Another distinct advantage of the use of such an oil contacting process as described is that there is no pressure drop introduced into the gas stream. When devices which require pressure to force the gases through the apparatus were substituted for the described oil contacting apparatus additional polymer formed as a result of the increased pressure. Thus, the usual tar removing devices not only become plugged with the already formed tar but also produce additional tar. The described oil contacting device of the invention not only does not cause a build-up in pressure, but rather it tends to create a vacuum, which reduces polymer formation. A further advantage of utilizing the present process whereby pressure is not built up in the apparatus or process for removing tars is that additional compressor capacity is not required to condense the gases once the tars and polymers have been removed. That is, the gases are at a higher pressure prior to entering the compressor downstream than they would have been if pressure had been lost in treating the gases to remove tars and polymers.

Another advantage of the present invention is that a process is provided whereby methyl halides may be produced simultaneously with the dehydrogenated organic product. When halogen is utilized in the dehydrogenation zone the gases to be purified contain a mixture of halogen-containing organic compounds. Generally the halogen compounds containing 2 or more carbon atoms tend to comprise such a mixture of various molecular weights and configurations that separation is impractical. Moreover, these halogen compounds having two or more carbon atoms are quite often polymeric or tarry in nature, or at least they are mixed with tars and polymers and consequently constitute an undesirable impurity in the gas stream. On the other hand, the methyl halides constitute an important component of the mixture of gases. The methyl halides are valuable products and are one of the desired products of the process. The methyl halides may be utilized as a source of halogen in the dehydrogenation zone or may be used for other well known purposes. It is an advantage of the process that the methyl halides may be separated from the halogen compounds having two or more carbon atoms. According to this invention, the methyl halides present in the impure hydrocarbon stream which is treated in the oil contacting step remain in the gaseous phase leaving the oil contacting step and the undesired higher molecular weight halogen compounds are dissolved in the oil in this step. These methyl halides can then be removed from the gaseous stream downstream from the oil contacting step.

An advantage of the present process is that neither the methyl or higher halogen compounds are hydrolyzed to hydrogen halide to any extent as is the case with certain other possible schemes to separate these materials from the gaseous stream. Because the impure gaseous stream to be treated may contain water, in addition to the hydrocarbons and methyl and higher halogen compounds, there is a possibility that these halogen compounds will be hydrolyzed to the halogen acids. One serious disadvantage to such a hydrolysis reaction is that the hydrogen halide acids so formed are extremely corrosive and may attack the equipment. Furthermore, if the methyl halides are hydrolyzed, the byproduct methyl halides will be, of course, destroyed. We have found that by the use of the novel oil contacting step that the methyl halides are not hydrolyzed but rather go through the oil contacting step with the gaseous treated stream and that the higher halogen compounds are dissolved in the oil. Other advantages will be apparent from the description which follows.

The preferred compounds to be dehydrogenated are aliphatic hydrocarbons of 2 to 6 carbon atoms, which contain at least two adjacent carbon atoms, each of which carbon atom has at least one hydrogen atom attached. The dehydrogenation will produce compounds having double and/or triple bonds in aliphatic chains. Thus, butadiene-1,3 and/or vinylacetylene may be produced from butene-1 or butene-2 or mixtures thereof, and isoprene may be produced from any of the methyl butenes, such as 2-methyl butene-1, 2-methyl butene-2 or 2-methyl butene-3 or mixtures thereof. Isoprene may also be produced from methyl butanes, such as 2-methyl butane; also olefins and diolefins may be produced from saturated hydrocarbons, for example, vinyl acetylene, butadiene and butene may be produced from n-butane. A mixture of monoolefins and diolefins may also be produced, such as a mixture of butadiene-1,3 and butenes from a feedstock of a mixture of n-butane and butene. Good results have been obtained with a feed containing at least 50, such as at least 75, mol percent of an aliphatic hydrocarbon of 4 to 5 carbon atoms, such as the hydrocarbons of 4 to 5 carbon atoms having a straight chain of at least 4 carbon atoms, with the hydrocarbon being saturated or having a single double bond or mixture thereof.

I claim:

Oxygen will generally be supplied to the dehydrogenation zone in the range of about 0.20 mol of oxygen to 2.0 or 3.0 mols of oxygen per mol of hydrocarbon to be dehydrogenated. A preferred range for the oxygen is from about 0.3 to 1.50 mols of oxygen per mol of hydrocarbon to be dehydrogenated. Either pure oxygen or oxygen diluted with diluents may be utilized.

The source of any halogen fed to the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides such as ethyl iodide, methyl bromide, 1,2-dibromo ethane, ethyl bromide, amyl bromide and allyl bromide; cycloaliphatic halides such as cyclohexylbromide; aromatic halides such as benzyl bromide; halohydrins such as ethylene bromohydrin; halogen substituted aliphatic acids such as bromoacetic acid; ammonium iodide; ammonium bromide; ammonium chloride; organic amine halide salts such as methyl amine hydrobromide; and the like. Mixtures of various sources of halogen may be used. The preferred sources of halogen are hydrogen bromide, hydrogen iodide, hydrogen chloride, ammonium bromide, ammonium iodide, ammonium chloride, alkyl halides of 1 to 6 carbon atoms and mixtures thereof, with the iodine and bromine compounds being particularly preferred. When terms such as halogen liberating materials or halogen materials are used in the specification and claims, this includes any source of halogen such as elemental halogens, hydrogen halides or ammonium halides. The amount of halogen, calculated as elemental halogen, may be as little as about 0.001 or less mol of halogen per mol of organic compounds to be dehydrogenated to as high as 0.2 or 0.5 or higher. The preferred range is from about 0.001 to 0.09 mol of halogen.

The dehydrogenation process may be conducted in the absence of contact catalysts, but better results are obtained if the reaction is conducted in the presence of metal or metal compounds such as the oxides or halides as catalysts. Metal or metal compound catalysts broadly may be included as catalysts in the dehydrogenation zone.

The dehydrogenation processes will normally be conducted at a temperature of reaction between about 400° C. to about 850° C. or higher, such as about 1,000° C. The temperature of reaction is measured at the maximum temperature in the reactor. The flow rates of the reactants through the reactor may be varied quite widely and can be established by those skilled in the art. Good results have been obtained with flow rates of the compound to be dehydrogenated ranging from about ¼ to 25 liquid volumes of compound to be dehydrogenated per volume of reaction zone per hour, with the volumes of liquid calculated at standard conditions of 15.6° C. and 760 mm. of mercury absolute. The reaction zone is defined as the portion of the reactor which is at a temperature of at least 400° C. The residence or contact time of the reactants in the reaction zone under any given set of reaction conditions depends on all the factors involved in the reaction. Contact times such as from about 0.001 to about 5 to 10 seconds have been found to give excellent results. Generally the contact time will be between about 0.01 and one second. Contact time is the calculated dwell time of the reaction mixture in the reaction zone assuming the mols of product mixture are equivalent to the mols of feed.

The dehydrogenation zone reactor may be either a fixed bed reactor or a fluid bed reactor. Reactors conventionally used for the dehydrogenation of hydrocarbons to butadiene may be employed. The total pressure in the dehydrogenation zone will normally be about atmospheric pressure. However, higher pressures or vacuum may be used. Higher pressures, such as up to about 100 to 200 p.s.i.g. may also be employed.

The effluent from the dehydrogenation zone will contain the impure unsaturated organic product and perhaps some unconverted feed, residual oxygen, steam and halogen in various forms. Steam will generally be present in amount from about 10 to 96 mol percent of the effluent, and more frequently will be present in an amount from 25 to about 96 mol percent. The organic phase including dehydrogenated product, any unreacted feed, polymer, tar, precursors of polymers and tars and any organic decomposition products will usually range from about 3 to 50 mol percent of the effluent and generally will be within the range of about 3 to 30 or 35 mol percent of the effluent.

The effluent gases leaving the dehydrogenation zone will generally be at a temperature of about or greater than 400° C. or 450° C. to 1,100° C., depending upon the particular dehydrogenation process. Preferably, the effluent gases are then cooled by a quench. A preferred quench will be an aqueous quench containing from 0 to 55 mol percent, preferably from 0.005 to about 45 mol percent inorganic halogen [1], calculated on the basis of the equivalent mols of halogen. The quenched gases will then be at a temperature of no greater than about 450° C. such as less than 350° C. The gaseous stream at this point will preferably contain less than 10 mol percent halogen based on the total organic phase in the stream, such as less than 5 mol percent; for example, the gas stream might contain from 0.0001 to about 3 or 10 mol percent halogen based on the total organic phase. This cooled gaseous stream may then be contacted with the oil in the oil contacting step. However, better results are usually obtained if at least a portion of the inorganic halogen as well as some of the water is removed from the gaseous stream prior to the oil contacting step. In this preferred step for the removal of halogen prior to contacting with the oil, from about 25 to about 99 mol percent of any inorganic halogen is separated and preferably from at least 50 or 60 mol percent to about 99 mol percent of the inorganic halogen is removed. Separation may be by any means such as by cooling the gases to a temperature low enough to condense the halogen such as a temperature of less than 300° C. Inorganic halogen such as ammonium halide may be cooled and separated such as by allowing the ammonium halide to plate out on surfaces provided for such purposes or the condensed inorganic halogen may be filtered out. All or a portion of the steam may be removed by condensation either simultaneously by the separation of the inorganic halogen or in a separate step. Preferably at least from about 25 or 50 to 100 mol percent of the steam present in the gaseous stream will be separated prior to contacting the gaseous phase with the oil. Means for condensing the steam such as tube type heat exchangers may be employed.

The gaseous stream to be treated in the oil contacting step may be at a temperature of 5 to 300° C. but preferably will have a temperature within the range of 20 to 100° C. According to one of the preferred features of this invention, if the gaseous composition is maintained at a temperature of no greater than 100° C., and preferably less than 50° C., the organic halides contained in the gaseous composition are hydrolyzed only to a minor degree. A preferred composition to be treated with the oil will contain from 2 to 90 mol percent hydrocarbon phase such as from 4 to 50 mol percent hydrocarbons. The gaseous stream will contain from 0 to 50 mol percent steam and preferably will contain less than 25 mol percent steam. Inorganic halides will usually be present from about 0.001 to 50 mol percent, but better results are obtained if the inorganic halides are present in an amount of less than 5 mol percent and more preferably less than 1 mol percent. Organic halides may be present in an amount of 0.001 to 5 or 15 mol percent such as between 0.01 and 0.10 or 1.0 mol percent. The major portion of these organic halides will have from 1 to 12 carbon atoms and will contain from 1 to 4 atoms of halogen.

Referring again to FIGURE 1, the gaseous composition to be treated is conducted to the oil contacting apparatus via conduit 1. The oil is forced under pressure through the nozzle 5 into the chamber where it contacts the incoming gaseous stream. The mixing chambers 7 and 8 preferably has a diffuser shape as shown in FIGURE 1 in which the chamber tapers to a minimum diameter near the middle 6 and then flares out to a maximum diameter at the exit 3. The oil is sprayed into the elongated chamber concurrent to the flow of the gases and at a point upstream from the point of minimum diameter 6. The gases passing through the oil contacting device are under conditions of a high velocity turbulent flow and the intimate contact between the oil and the gas is thereby achieved. The essential features of the elongated diffuser chamber are that it must have an inlet section which is a contraction zone for the gases attached to a restricted zone which in turn is attached to an expansion zone. The contraction zone may be connected directly to the expansion zone and in this instance the point of maximum restriction is simply the point at which the cross sectional area ceases to decrease and begins to increase. Another possibility is for the contraction zone to be connected to a throat which is of a constant cross sectional area and is of some finite length; the throat may then be connected to the expansion zone. Preferably, the contraction zone will be simply tapered down to the restricted area and the expansion zone tapered outwardly from the restricted area. By such a procedure minimum head loss is achieved. However, although preferred, it is not necessary that the tapering in either of the contraction or the expansion zones be uniform, nor is it essential that either of the zones be cylindrical in shape. An efficient design of the diffuser chamber is whereby the contraction zone has a greater taper or angle than the expansion zone. For example, the angle of contraction will preferably be at least 10 percent greater than the angle of expansion. The angle of the contraction zone usually will be from about 10 to 90°, such as between 20 and 60°, and the angle of expansion may be desirably from about 1 to 45° and preferably may be from about 3 to 15°. These angles of contraction and expansion are measured as illustrated in FIGURE 2, with angle 2 being the angle of contraction and angle 1 being the angle of expansion.

The pressure necessary to spray the oil through the nozzles may be supplied such as by a centrifugal pump. Conveniently, the oil pressure will range from about 5 to 500 p.s.i.g. as measured at point 5. The quantity of oil utilized to contact the gas may be expressed as the number of gallons per minute required to treat a specified volume of cubic feet per minute of gases passing through the oil contacting apparatus. Suitable ranges for the amount of oil utilized are from 5 to 200 c.f.m. per g.p.m. and may be desirably within the range of about 8 to 60 c.f.m. per g.p.m., with both the gallons of oil and the cubic feet of gas being calculated at standard conditions of 760 mm. of mercury and 25° C.

The pressure at which the gaseous stream is contacted with the oil may be about atmospheric or may be above or below atmospheric, so long as the critical features are maintained within the specified limits. A convenient pressure in the oil contacting apparatus is from about 0.05 to ---
[1] All forms of inorganic halogen such as hydrogen halide, elemental halogen and ammonium halide, calculated as the equivalent mols of elemental halogen.

5 p.s.i.g. The pressure drop through the oil contacting apparatus will generally be less than 5 inches of water, such as no pressure drop. And preferably the oil contacting apparatus will create a vacuum of from 0.5 to 5.0 inches of water.

The oil spray will generally produce droplets of an average size of about .005 to 10 millimeters in diameter, with an average size of from .01 to 5 millimeters in diameter. The oil should have a boiling point at atmospheric pressure such that at least 90 volume percent boils at a temperature of at least 50° C. and preferably of at least 80° C. Suitable oils will have an initial boiling point of at least 50° C. and a final boiling point of no greater than 450° C. The oil should be selected from paraffinic, naphthenic and aromatic oils and mixtures thereof having a bromine number [2] of no more than 50 and preferably hydrocarbons having a bromine number of no greater than 40. The aromatic oils are preferred. Oils having initial bromine numbers of between 0 and 25 are preferred. The oil should generally have a Saybolt [3] viscosity at 100° F. of at least 10 seconds and preferably should be at least 20 or 30 seconds, such as between 30 and 300 seconds. Examples of suitable oils are paraffin oils such as n-heptane, n-octane, n-nonane, and n-decane; naphthenes such as methyl cyclohexane, ethyl cyclohexane; o-xylene, p-xylene, toluene and mixtures thereof.

Referring again to FIGURE 3, oil may be recovered in tank 5 and recycled to spray nozzles via line 7. It is a preferred feature of this invention that the temperature of the oil spray into the vapor zone should be maintained at a temperature of at least as high the the dew point of any water contained in the incoming gaseous stream. This temperature will usually be at least 40° C. If the temperature of the oil is allowed to drop below the dew point of the steam in the incoming gases it has been found that emulsions will form in the oil. The temperature of the oil may be maintained by the heat exchanger 6 wherein the oil may be heated whenever needed. Preferably the oil temperature to the nozzles will be maintained at a temperature of at least 1 to 5 degrees higher than the dew point of the steam and the incoming gases. The polymer and tars in the incoming gases are dissolved in the oil. The polymer build-up in the oil may be removed by diverting a portion of the oil from tank 5 by line 8 to a rerun tower D wherein polymer is removed by line 10. The clean oil is returned to the seal tank by line 9.

It was one of the unexpected features of this invention that the polymers and tars would dissolve in the oil under these conditions. Tars and polymers, collected from equipment and packing material previously used in an attempt to separate the tars and polymers from the gas stream, could not be successfully dissolved by mixing in oil of the same temperature. However, by contacting the gaseous stream in an oil contacting device according to this invention, the tars are continuously removed by solution in the oil.

The purified gaseous stream leaves the oil contacting device by line 11 and the organic halides (methyl halide) may be separated from the remainder of the composition at E by any conventional means for separating these compositions. The organic halides (methyl halides) are recovered as a product 13. The dehydrogenated composition is recovered at 12. The dehydrogenated composition 12 may be further purified by means known in the art such as by extractive distillation to separate butadiene from the remaining components.

Modifications of the process of this invention may be employed. For instance, a combination of steps may be utilized in the place of any of the described single steps. It is a preferred feature of this invention that two or more oil contacting steps may be utilized in series.

---

[2] ASTM D–1158.
[3] ASTM D–88–56.

A specific example of the invention is as follows:

A gaseous composition comprising hydrocarbons, air, steam, and ammonium bromide was dehydrogenated in a fixed bed catalyst reactor. The hydrocarbon composition comprised by mol percent approximately 49 percent butylene-2-lo, 44 percent butylene-2-hi, 2 percent butadiene-1,3, 4 percent n-butane, with the remainder being saturated and unsaturated aliphatic hydrocarbons of from 4 to 5 carbon atoms. The total hydrocarbon composition was fed at a rate of 74.4 pounds per hour, with 69.6 pounds per hour of this being butene. The composition contained steam in an amount of 12 mols of steam per total mols of hydrocarbon. This amount of steam was 286 pounds per hour. Oxygen was fed in the form of air in an amount equivalent to 0.60 mols of oxygen per total mols of hydrocarbon. The feed rate for the air was 112 pounds per hour. Ammonium bromide was fed as an aqueous solution containing 28.5 weight percent ammonium bromide based on the total weight of the solution. The ammonium bromide was present in an amount calculated as equivalent to 0.015 mol of bromine ($Br_2$) per total mols of hydrocarbon.

The gaseous composition was passed through a fixed bed reactor containing an iron oxide catalyst coated on alumina carrier particles. The catalyst particles were about 2 to 5 mesh size and contained 75 percent by weight carrier. The inlet temperature to the reactor was 495° C., the maximum temperature in the reactor was 695° C., and the exit temperature from the reactor was 690° C. The gaseous flow rate to the reactor was 1.25 liquid volume of gaseous hydrocarbon per volume of catalyst bed per hour (with the volume of liquid hydrocarbon being calculated at 60° F. and 760 mm. of mercury), the hot effluent gases from the reactor were quenched with an aqueous solution of ammonium bromide containing 28.5 weight percent ammonium bromide. The temperature of the quench solution was 110° C. and the quench solution was fed at a rate of 5,050 pounds per hour. The quenched gases were then at a temperature of about 120° C., and a pressure of 3.6 p.s.i.g. The quenched gaseous effluent was then contacted with 2,485 pounds per hour of an aqueous ammonium bromide solution containing 28.5 weight percent ammonium bromide. This contact was made in a pressure drop zone which was essentially two truncated cones joined at the small ends to form a throat. The ammonium bromide solution was sprayed into the throat of the pressure drop zone perpendicularly to the flow of the gases. The pressure drop across the pressure drop zone was approximately 60 inches of water. The temperature of the gaseous composition leaving the pressure drop zone was about 105° C. An aqueous halogen solution containing 27 weight percent ammonium bromide was then separated from the gaseous stream. This separation was accomplished by using a cyclone type separator. A portion of this recovered aqueous solution of ammonium bromide was cooled and used as quench water for the dehydrogenation reactor effluent, and another portion was used as the contacting water in the pressure drop zone. The gaseous composition leaving the cyclone separator was then cooled in a condenser. The gaseous composition leaving the condenser then comprised the remainder of the steam, some oxygen, inerts such as nitrogen, ammonium bromide, an organic phase including hydrocarbons, methyl bromide, organic bromine compounds having two or more carbon atoms and oxygenated hydrocarbons such as carbonyls. This gaseous composition was at a temperature of about 102° C., and contained approximately all of the uncondensable inerts such as nitrogen fed to the dehydrogenation reactor. This composition contained approximately 78.0 mol percent steam, 7.2 mol percent organic phase, with the remainder being essentially ammonium bromide, oxygen, and various gases such as nitrogen. The ammonium bromide was present in an amount of 8.3 mol percent based on the total mols of the organic phase. The organic phase comprised approximately 62.4 mol percent butadiene, organic carbonyl compounds and 0.535 weight percent organic bromides, including methyl and higher bromides with the remainder being essentially unsaturated aliphatic hydrocarbons such as butene and propylene.

The gaseous composition was fed into the bottom of a packed spray tower which was 1.2 feet in diameter and 14 feet high. The tower was packed with 11 feet of packing. The temperature at the bottom of the column was 92° C. and at the top was 33° C. In this tower the gaseous mixture was contacted countercurrently with a spray of an aqueous solution of ammonium bromide. The pressure drop through the tower was about 8 inches of water, with the tower being operated at slightly above atmospheric pressure. The spray ater was fed at the rate of 3,750 pounds per hour, and was at a temperature of 32° C. From the bottom of the tower was taken an aqueous solution of ammonium bromide. This aqueous solution amounted to 4,205 pounds per hour, and was at a temperature of 92° C. This aqueous solution contained tars and tarry precursors as well as 0.03 mol percent ammonium bromide. The aqueous solution taken from the bottom of the tower was cooled and returned to the sprays at the top of the packed spray tower.

Exit gases from the top of the packed spray tower had a temperature of about 33° C. and a flow rate of about 194 lbs./hr. The exit gases from the top of the packed spray tower contained 29.4 mol percent organic phase, and 5.2 mol percent steam. The organic phase contained 0.18 mol percent methyl bromide, 83.0 mol percent $C_4$ hydrocarbons and less than 10 parts per million ammonium bromide. The hydrocarbon phase contained 9.7 mol percent butylene-2 lo, 8.0 mol percent butylene-2 hi, 62.4 mol percent butadiene-1,3, 1.9 mol percent n-butane, 1.0 mol percent butylene-1, with the remainder being essentially $CO_2$ and aliphatic hydrocarbons of 2 to 5 carbon atoms. This gaseous composition at a temperature of 33° C. was fed to an oil contacting scrubber as shown in FIGURE 1 of the drawing. In the oil contacting scrubber the gases were contacted with 1,250 lbs./hr. of o-xylene of a temperature of 24° C. A $7/_{32}$ inch spray nozzle was used and the pressure at the spray nozzle was 30 p.s.i.g. The flow rate of the gases through the oil contacting scrubber was 33.7 cubic feet per minute. The ratio of the amount of o-xylene utilized to the gas flow was 13.5 c.f.m. per g.p.m. of gas passing through the oil contacting scrubber.

The o-xylene containing the removed organic bromides having at least 2 carbon atoms, tars, precursors of tars and polymers was fed to a rerun distillation tower where the o-xylene was distilled off overhead and the tars and precursors were taken off as bottoms.

The treated gases leaving the oil contacting scrubber contained about 2.9 mol percent organic phase and about 5 mol percent steam. The gaseous hydrocarbon components of the organic phase remained essentially unchanged, but the organic bromine compounds ($C_2$ and higher) were reduced to 0.06 weight percent based on the organic phase. The remaining gaseous organic phase containing the butadiene-1,3 and other hydrocarbons together with the methyl bromide were passed to a tower to separate the methyl bromide product from the hydrocarbons. The hydrocarbons from which the methyl bromide has been separated were then passed to a series of distillation and purification steps to separate the butadiene-1,3 product.

I claim:

1. In a process wherein an aliphatic hydrocarbon containing 4 to 5 carbon atoms is contacted with oxygen at a temperature of at least 400° C. in a dehydrogenation zone to produce a gaseous effluent comprising unsaturated aliphatic hydrocarbons containing 4 to 5 carbon atoms, tars, polymers, and precursors thereof, the improvement comprising feeding the gaseous effluent into an inlet section of an elongated diffuser chamber to maintain a vapor zone in the chamber, the diffuser chamber being characterized by said inlet section which provides a contraction zone for the said gaseous effluent, the inlet section communicating with a restricted zone, and the restricted zone communicating with an expansion zone for the said gaseous effluent; intimately contacting the said gaseous effluent in the vapor zone provided by the diffuser chamber with an oil selected from the group consisting of paraffinic, naphthenic and aromatic oils and mixtures thereof having a boiling point such that at least 90 volume percent of the oil boils at a temperature of at least 50° C., a bromine number of no greater than about 50 and a Saybolt viscosity at 100° F. of at least 10 seconds; the ratio of the said gaseous effluent to the oil being from 5 to 200 cubic feet per minute of gaseous effluent per gallon per minute of oil, said oil being sprayed into the vapor zone concurrently with the flow of the gaseous effluent at a velocity which provides turbulent mixing of the oil and gaseous effluent, the oil and gaseous effluent passing through the restricted zone and expansion zone of said diffuser chamber; separating a purified gaseous stream from the oil, and recovering the unsaturated aliphatic hydrocarbon containing 4 to 5 carbon atoms from the gaseous stream.

2. The process of claim 1 wherein halogen is present in the dehydrogenation zone.

3. The process of claim 1 wherein the pressure drop across the diffuser chamber is less than 5 inches of water.

4. The process of claim 3 wherein the oil is selected from the group consisting of n-heptane, n-octane, n-nonane, n-decane, methyl cyclohexane, ethylcyclohexane, o-xylene, p-xylene, toluene, and mixtures thereof, and no pressure drop is created in the diffuser chamber.

5. A method for dehydrogenation which comprises: (1) at a temperature of at least 400° C. reacting a member selected from the group consisting of aliphatic hydrocarbons containing 4 carbon atoms, aliphatic hydrocarbons containing 5 carbon atoms, and mixtures thereof, said aliphatic hydrocarbons having a straight chain of at least 4 carbon atoms, with oxygen, halogen and steam to form a gaseous effluent comprising the corresponding $C_4$ to $C_5$ unsaturated aliphatic hydrocarbon, tars, polymers, precursors of tars and polymers, steam, inorganic halogen, methyl halides and organic halogen compounds having at least 2 carbon atoms, (2) separating from the gaseous effluent at least 50 mol percent of the steam and at least 60 mol percent of the inorganic halogen, (3) feeding the remaining gaseous effluent into a contraction zone of an elongated diffuser chamber to maintain a vapor zone in the diffuser chamber, and dissolving said organic halogen compounds having at least 2 carbon atoms, tars, polymers and precursors thereof from the entering gaseous effluent by intimately contacting the said gaseous effluent in the diffuser chamber with an oil selected from the group consisting of paraffinic, naphthenic and aromatic oils and mixtures thereof having a boiling point such that at least 90 volume percent of the oil boils at a temperature of at least 50° C., a bromine number of no greater than about 40 and a Saybolt viscosity at 100° F. of at least 10 seconds; said oil being sprayed into the diffuser chamber concurrently with the flow of the said gaseous effluent and at a velocity which provides turbulent mixing of the oil and the gaseous effluent in the diffuser chamber, the ratio of the said gaseous effluent to the said oil being from 5 to 200 cubic feet per minute of gaseous effluent per gallon per minute of oil, said oil being sprayed into the diffuser chamber at a temperature of at least as great as the dew point of the water contained in the gaseous effluent entering the diffuser chamber, the oil and gaseous effluent passing through a restricted zone and an expansion zone in said diffuser chamber, (4) separating a purified gaseous stream from the oil, and (5) recovering the $C_4$ to $C_5$ unsaturated aliphatic hydrocarbon and methyl halides from the gaseous stream.

6. A method for the simultaneous production of butadiene-1,3 and methyl bromide which comprises: (1) at a temperature of at least 400° C. reacting a mixture of butene, oxygen, ammonium bromide and steam to form a reaction product comprising butadiene-1,3, tars, polymers, precursors of tars and polymers, steam, ammonium bromide, methyl bromide and organic halides having at least 2 carbon atoms, (2) separating from the gaseous mixture at least 50 mol percent of the steam and at least 60 mol percent of the ammonium bromide from the gaseous stream, (3) feeding the remaining gaseous mixture at a temperature of less than about 50° C. into one end of an elongated diffuser chamber to maintain a vapor zone in the diffuser chamber and intimately contacting the said gaseous mixture in the diffuser chamber with o-xylene, said o-xylene being sprayed into the diffuser chamber concurrently with the flow of the said gaseous mixture and at a velocity which provides turbulent mixing of the oil and the gaseous mixture in the diffuser chamber, the ratio of the said gaseous mixture to the said o-xylene being from about 8 to 60 cubic feet per minute of gaseous mixture per gallon per minute of o-xylene, said o-xylene being sprayed into the diffuser chamber at a temperature of at least as great as the dew point of the water contained in the gaseous mixture entering the diffuser chamber, said o-xylene dissolving organic halides having at least 2 carbon atoms, tars, polymers and precursors thereof from the entering gaseous mixture, (4) separating the organic halides having at least 2 carbon atoms, tars, polymers and precursors thereof from the o-xylene and recycling the o-xylene to the spray to the diffuser chamber and (5) separating methyl bromide and butadiene-1,3 from the remaining gaseous mixture.

References Cited

UNITED STATES PATENTS

| | | | |
|---|---|---|---|
| 1,979,189 | 10/1934 | Bowers | 55—94 X |
| 2,414,816 | 1/1947 | Kleiber et al. | 260—680 |
| 2,440,525 | 4/1948 | Roetheli | 260—680 |
| 2,500,870 | 3/1950 | Robinson | 260—679 |
| 3,011,966 | 12/1961 | Jahnentz et al. | 208—81 |
| 3,180,904 | 4/1965 | Fischer et al. | 260—679 X |
| 3,200,166 | 8/1965 | Bojanowski | 260—681.5 |
| 3,207,805 | 9/1965 | Gay | 260—680 |

PAUL M. COUGHLAN, Jr., *Primary Examiner.*

U.S. Cl. X.R.

260—681.5